US009624703B1

(12) United States Patent
Lin

(10) Patent No.: US 9,624,703 B1
(45) Date of Patent: Apr. 18, 2017

(54) POSITIONING MECHANISMS OF DOUBLE-PINTLE HINGE

(71) Applicant: Leohab Enterprise Co., Ltd., Taichung (TW)

(72) Inventor: Chao-Chi Lin, Taichung (TW)

(73) Assignee: Leohab Enterprise Co., Ltd., Taichung (TW)

( * ) Notice: Subject to any disclaimer, the term of this patent is extended or adjusted under 35 U.S.C. 154(b) by 0 days.

(21) Appl. No.: 15/047,961

(22) Filed: Feb. 19, 2016

(51) Int. Cl.
*E05D 3/06* (2006.01)
*E05D 11/10* (2006.01)
*F16C 11/10* (2006.01)

(52) U.S. Cl.
CPC ................ *E05D 3/06* (2013.01); *E05D 11/10* (2013.01); *F16C 11/10* (2013.01)

(58) Field of Classification Search
CPC .... E05D 3/12; E05D 3/06; E05D 3/10; G06F 1/1681; G06F 1/1616; G06F 1/1618; E05Y 2900/606; H04M 1/0216; H04M 1/0222; H04M 1/022; F16C 11/10; F16C 11/12; Y10T 16/54038; Y10T 16/5403; Y10T 16/54033; Y10T 16/547; Y10T 16/5474; Y10T 16/5475
See application file for complete search history.

(56) References Cited

U.S. PATENT DOCUMENTS 6,779,234 B1 * 8/2004 Lu ......................... G06F 1/1616 16/334
7,484,269 B2 * 2/2009 Chih ...................... F16M 11/10 16/340
8,296,905 B2 * 10/2012 Zhang ................... G06F 1/1681 16/330
8,339,777 B2 * 12/2012 Ling ..................... G06F 1/1616 16/340
8,385,991 B2 * 2/2013 Wang ........................ E05D 3/18 16/221
8,627,546 B2 * 1/2014 Zhang ................... G06F 1/1681 16/366
8,776,319 B1 * 7/2014 Chang ................... G06F 1/1681 16/303
8,780,570 B2 * 7/2014 Bohn .................... H04M 1/022 361/679.28
8,914,946 B2 * 12/2014 Hsu ......................... F16H 21/44 16/342

(Continued)

FOREIGN PATENT DOCUMENTS

TW M452593 U 5/2013

*Primary Examiner* — Chuck Mah
(74) *Attorney, Agent, or Firm* — Alan D. Kamrath; Kamrath IP Lawfirm, P.A.

(57) ABSTRACT

A double-pintle hinge includes a first pintle, a second pintle, and positioning mechanisms configured to allow the first and second pintles to rotate relative to each other to releasably retained positions. The positioning mechanisms include first and second joining members interconnecting the first and second pintles and sandwiching a first and second cams, a first and second cam followers, and a biasing member. The first cam is coupled to the first pintle. The second cam is coupled to the second pintle. The first and second cam followers are positioned between the first and second cams, and respectively abut the first and second cams, and are movably connected with each other. The biasing member is positioned between the first and second cam followers.

13 Claims, 8 Drawing Sheets

(56) References Cited

U.S. PATENT DOCUMENTS

| | | | | |
|---|---|---|---|---|
| 2007/0039132 | A1* | 2/2007 | Jung | H04M 1/0216 16/325 |
| 2009/0000062 | A1* | 1/2009 | Yamanami | G06F 1/1616 16/366 |
| 2011/0265288 | A1* | 11/2011 | Chiang | G06F 1/1681 16/341 |
| 2013/0111704 | A1* | 5/2013 | Mitsui | H04M 1/022 16/250 |
| 2013/0318746 | A1* | 12/2013 | Kuramochi | G06F 1/1681 16/342 |
| 2014/0352113 | A1* | 12/2014 | Chen | H04M 1/022 16/366 |
| 2015/0020351 | A1* | 1/2015 | Lin | E05D 11/06 16/366 |

* cited by examiner

POSITIONING MECHANISMS OF DOUBLE-PINTLE HINGE

BACKGROUND OF THE INVENTION

1. Field of the Invention

The present invention relates to a double-pintle hinge and, particularly, to position mechanisms of the double-pintle hinge.

2. Description of the Related Art

TW Pat. No. M452593 shows a double-pintle hinge. The hinge includes positioning mechanisms including a first and second cams and a cam follower disposed therebetween to interact therewith. The first and second cams each have a recess in which the cam follower selectively engages.

In order for the cam follower to movably engage in the recesses of the first and second cams, the size of the cam follower has to be smaller than the recesses. Furthermore, in order to reduce noise caused by interactions between the cams and the cam follower, a rubber sleeve is sleeved on the cam follower. Unfortunately, the sleeve wears out after a long use and wearing rubber bits clog up other components of the hinge.

The present invention is, therefore, intended to obviate or at least alleviate the problems encountered in the prior art.

SUMMARY OF THE INVENTION

According to the present invention, a double-pintle hinge includes a first pintle, a second pintle, and positioning mechanisms configured to allow the first and second pintles to rotate relative to each other to releasably retained positions. The positioning mechanisms include first and second joining members interconnecting the first and second pintles, with each including a first end thereof coupled to the first pintle in a manner that the first pintle is rotatable about a first axis relative to the first and second joining members and a second end thereof coupled to the second pintle in a manner that the second pintle is rotatable about a second axis relative to the first and second joining members. Furthermore, the first and second joining members sandwich a first and second cams, a first and second cam followers, and a biasing member. The first cam is coupled to the first pintle in a manner that the first cam rotates when the first pintle rotates. The second cam is coupled to the second pintle in a manner that the second cam rotates when the second pintle rotates. The first and second cam followers are positioned between the first and second cams, and respectively abut the first and second cams, and are movably connected with each other such that the first cam follower is able to slide on the second cam follower. The biasing member is positioned between the first and second cam followers such that the first and second cam followers are biased axially by the biasing member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the public generally, and especially the scientists, engineers and practitioners in the art who are not familiar with patent or legal terms or phraseology, to determine quickly from a cursory inspection the nature and essence of the technical disclosure. The abstract is neither intended to define the invention, which is measured by the claims, nor is it intended to be limiting as to the scope of the invention in any way.

Other objectives, advantages, and new features of the present invention will become apparent from the following detailed description of the invention when considered in conjunction with the accompanied drawings.

DETAILED DESCRIPTION OF THE INVENTION

Figure 1:
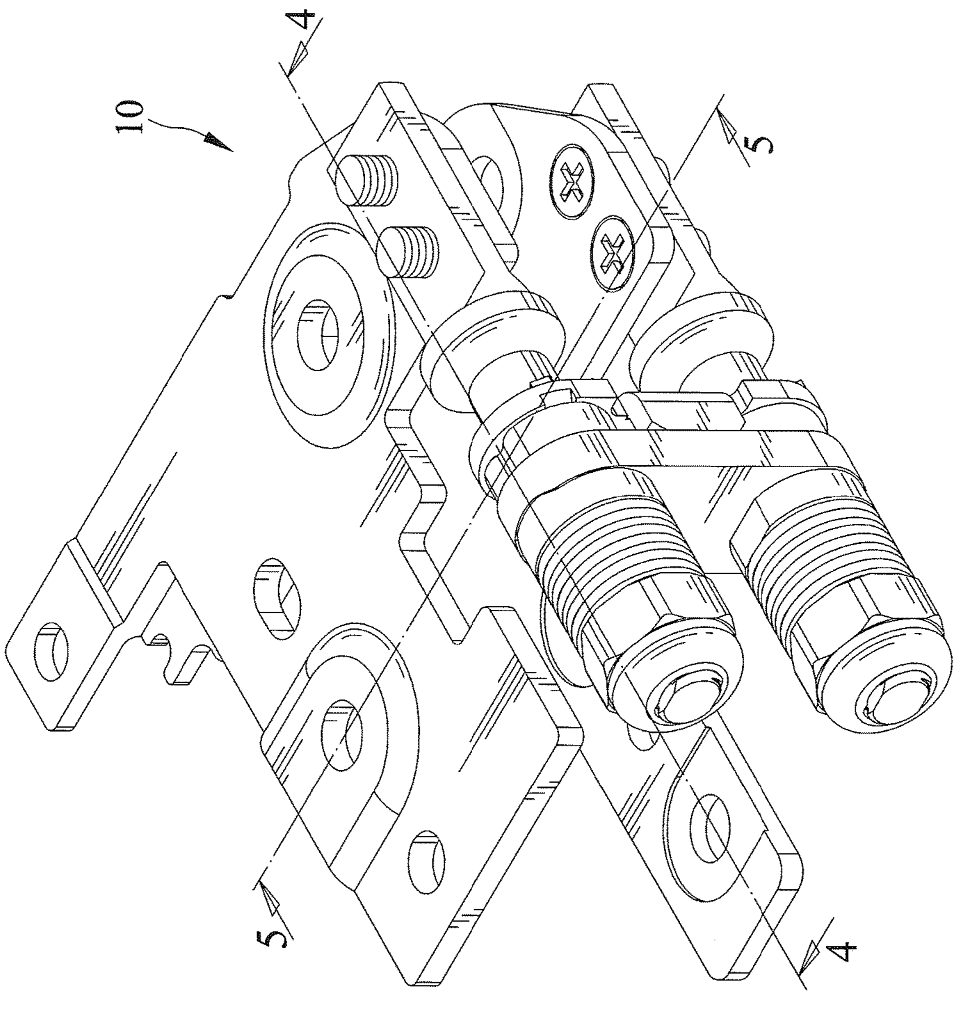
FIG. 1 is a perspective view of a double-pintle hinge in accordance with the present invention.
Figure 2:
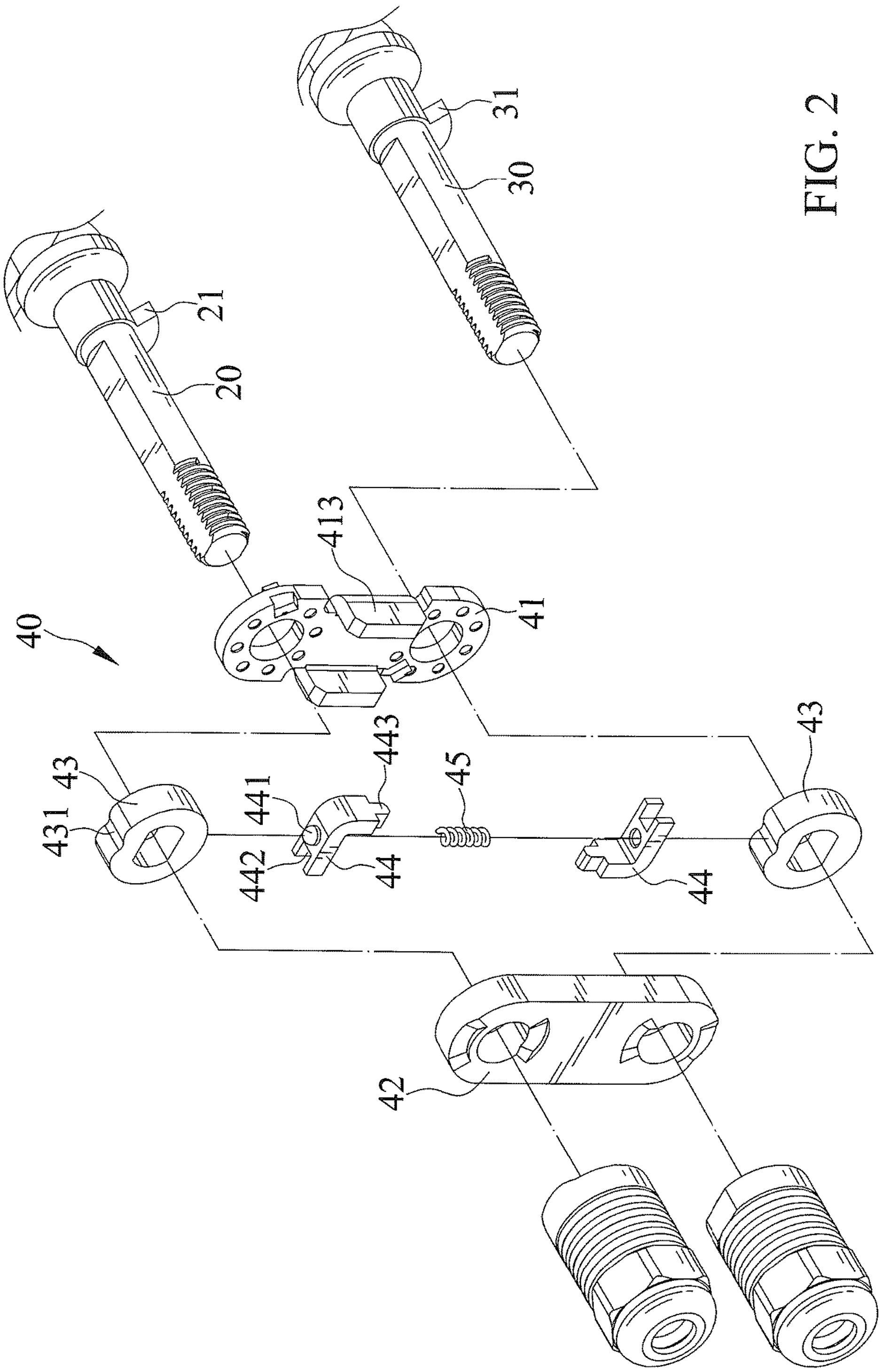
FIG. 2 is a partial, exploded perspective view of the double-pintle hinge of FIG. 1.
Figure 3:
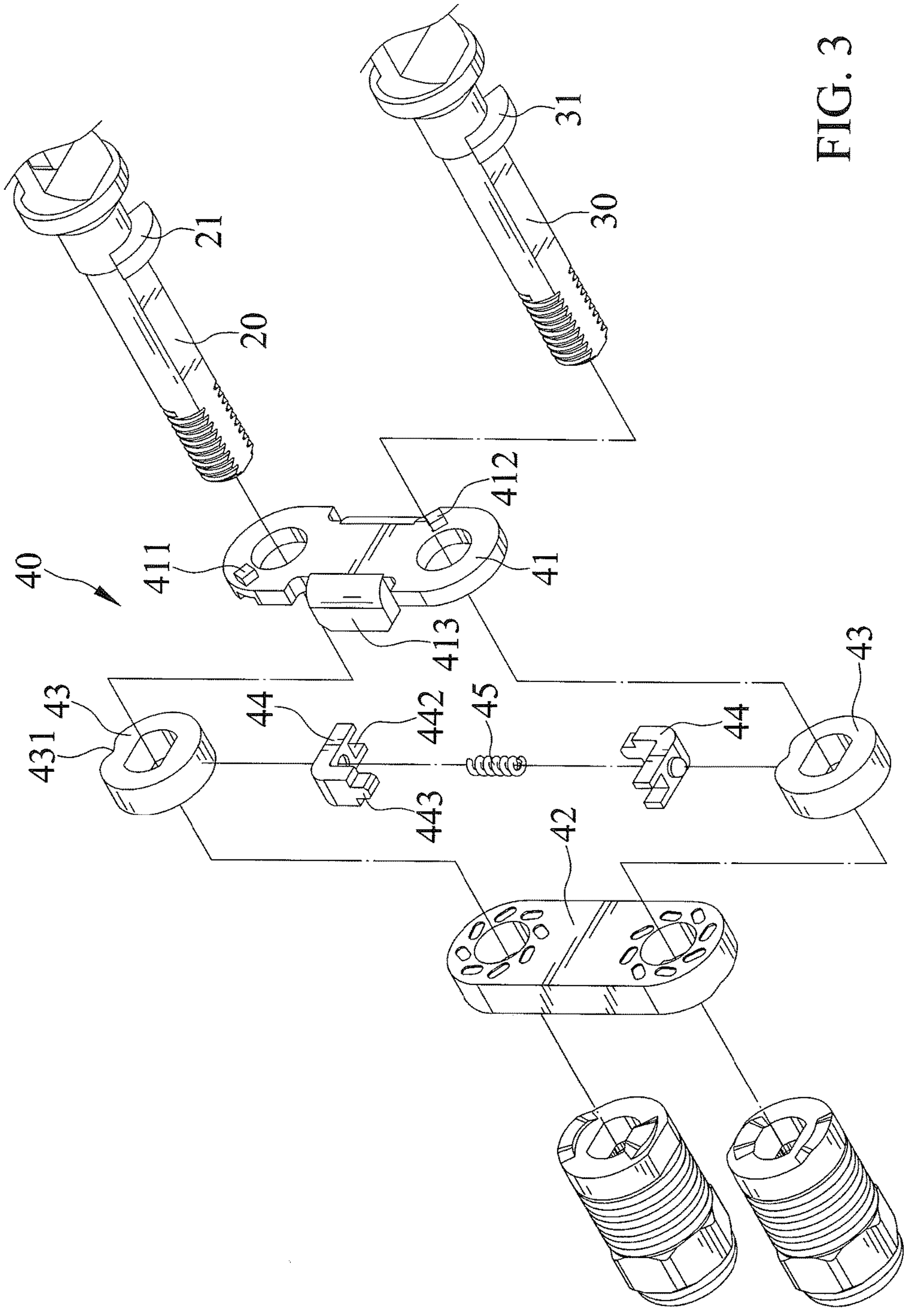
FIG. 3 is a partial, exploded perspective view similar to FIG. 2, but taken from a different angle.
Figure 4:
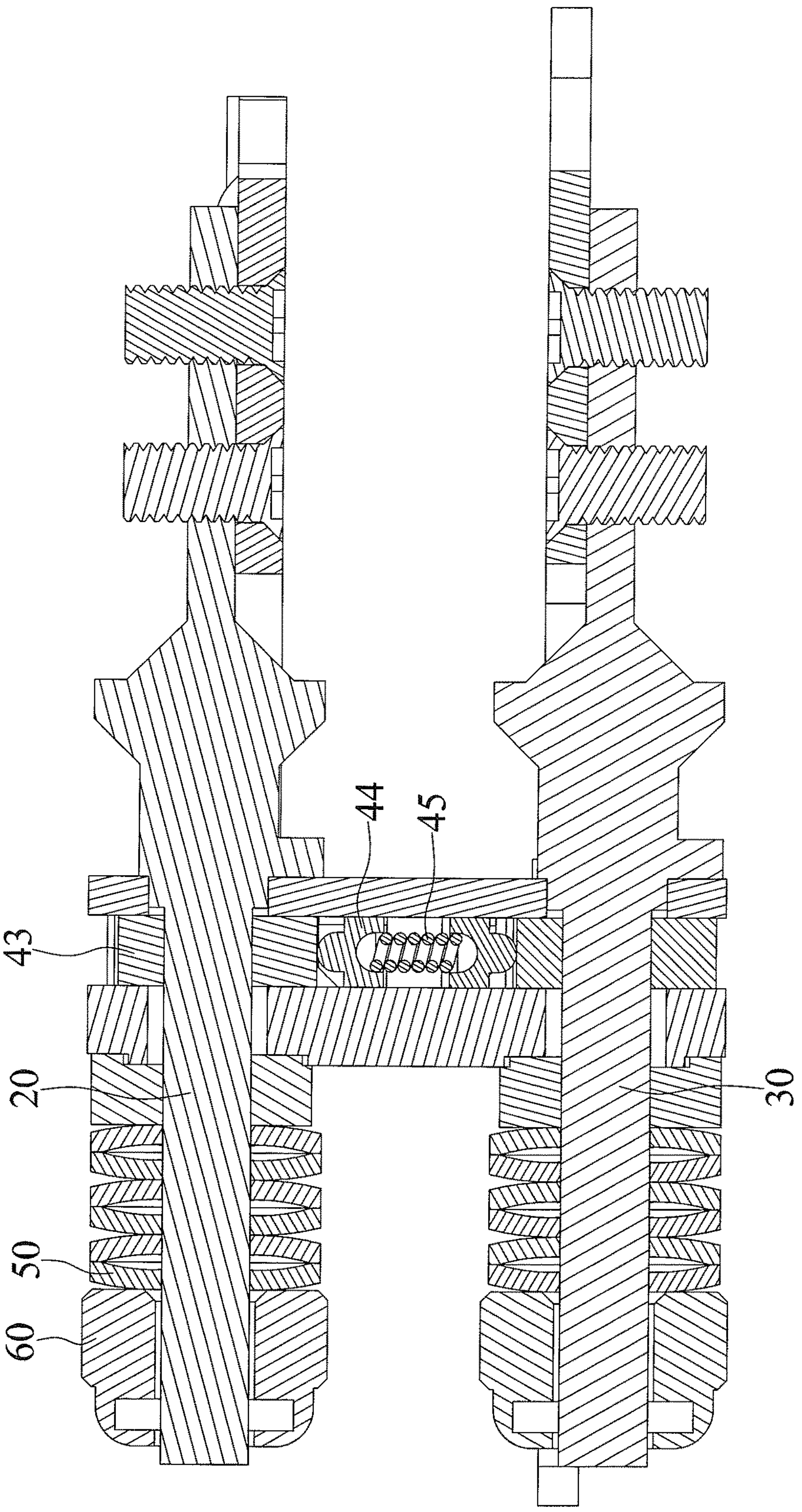
FIG. 4 is a cross-sectional view taken along line 4-4 of FIG. 1.
Figure 5:
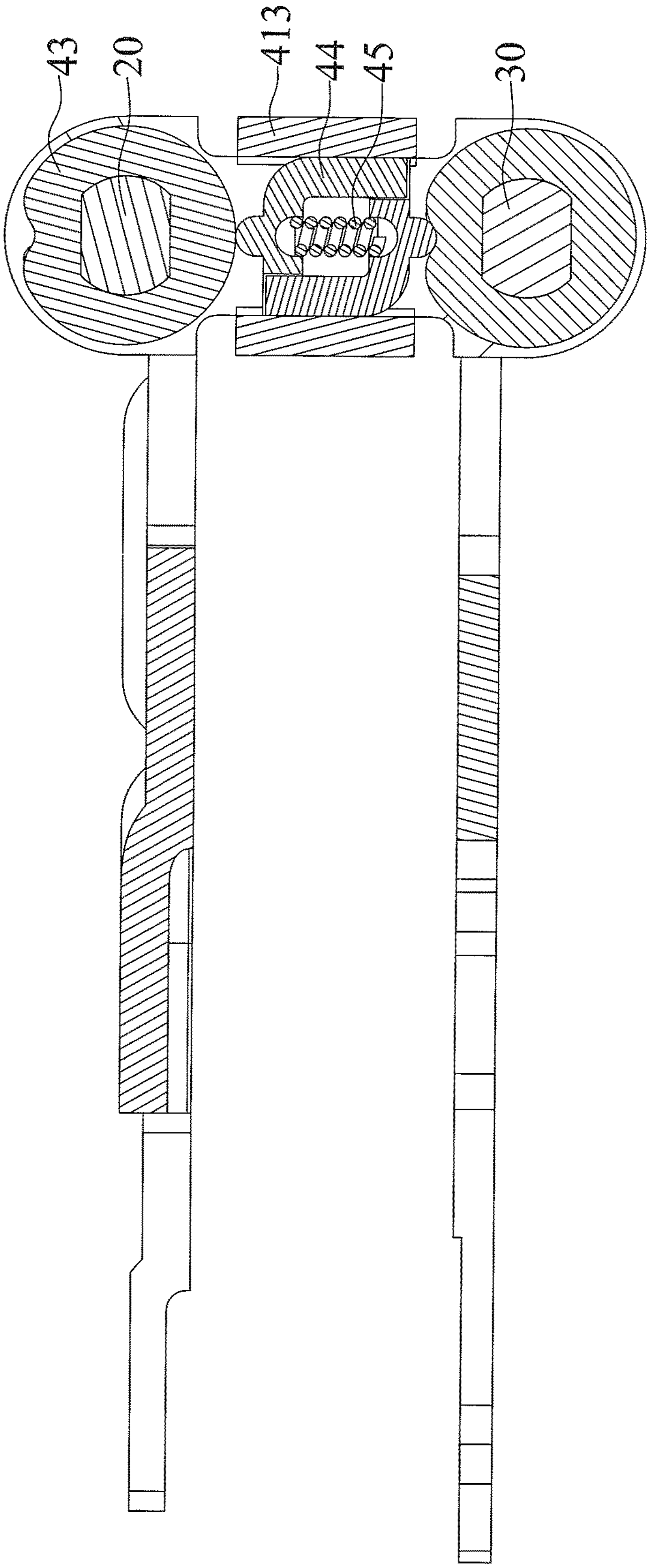
FIG. 5 is a cross-sectional view taken along line 5-5 of FIG. 1 and shows the hinge in a closed position.
Figure 6:
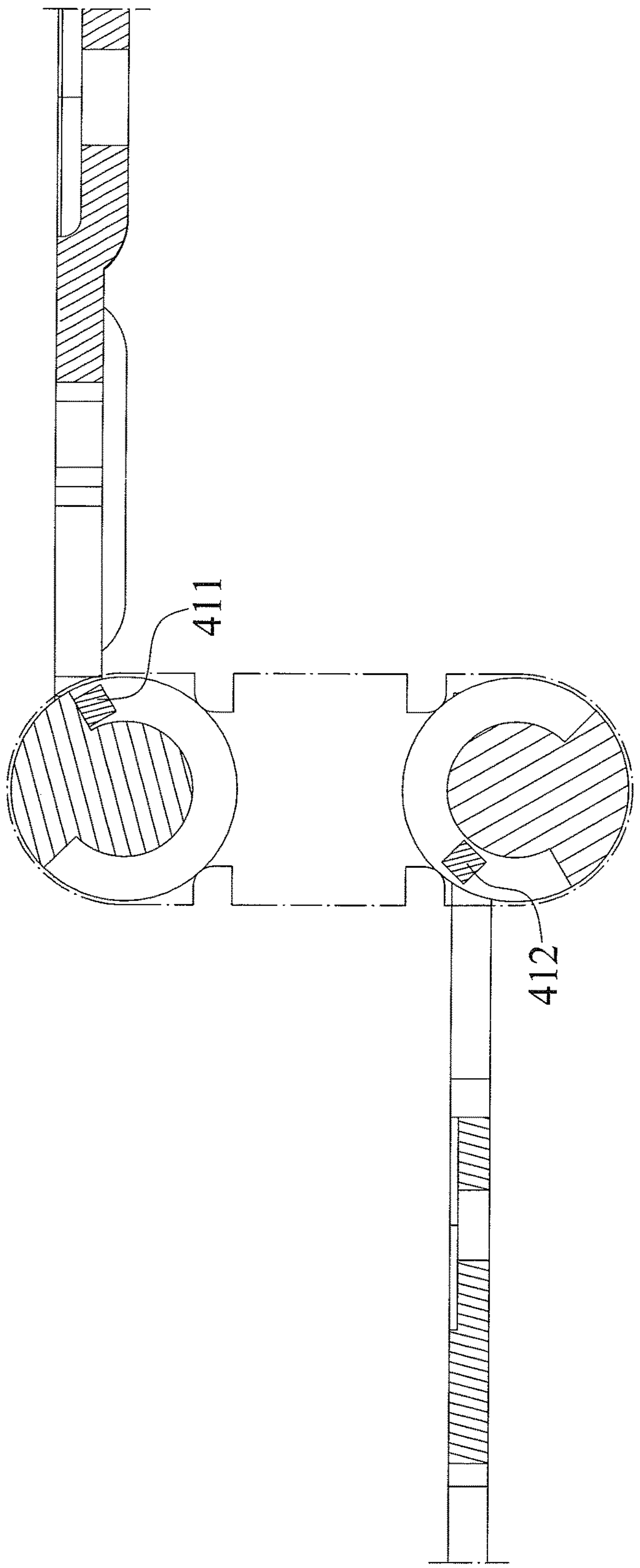
FIG. 6 is another cross-sectional view of the hinge of the present invention in a fully open position.
Figure 7:
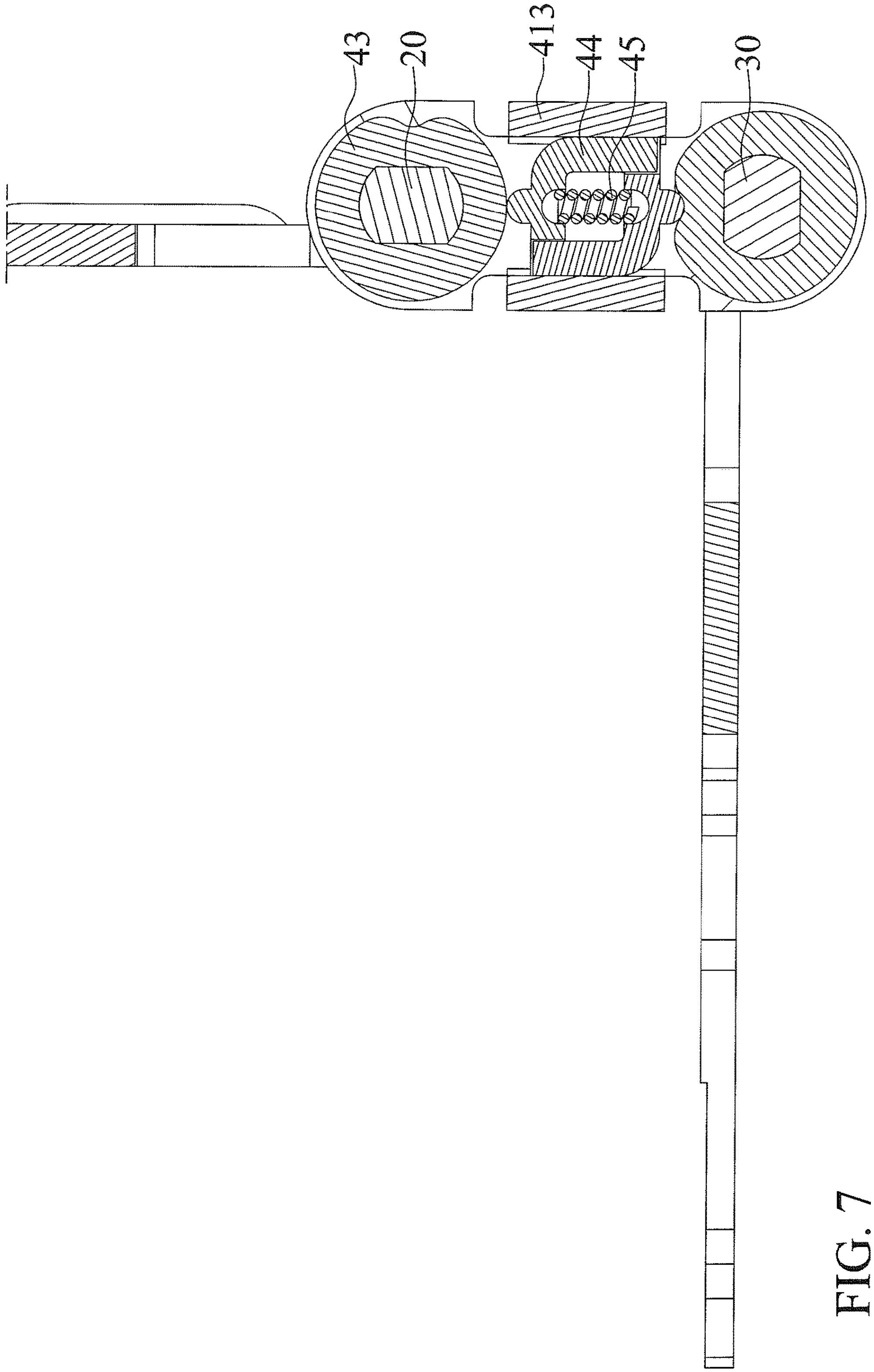
FIG. 7 is an extended cross-sectional view of FIG. 5, showing the hinge in another operating position between the closed and fully open positions.
Figure 8:
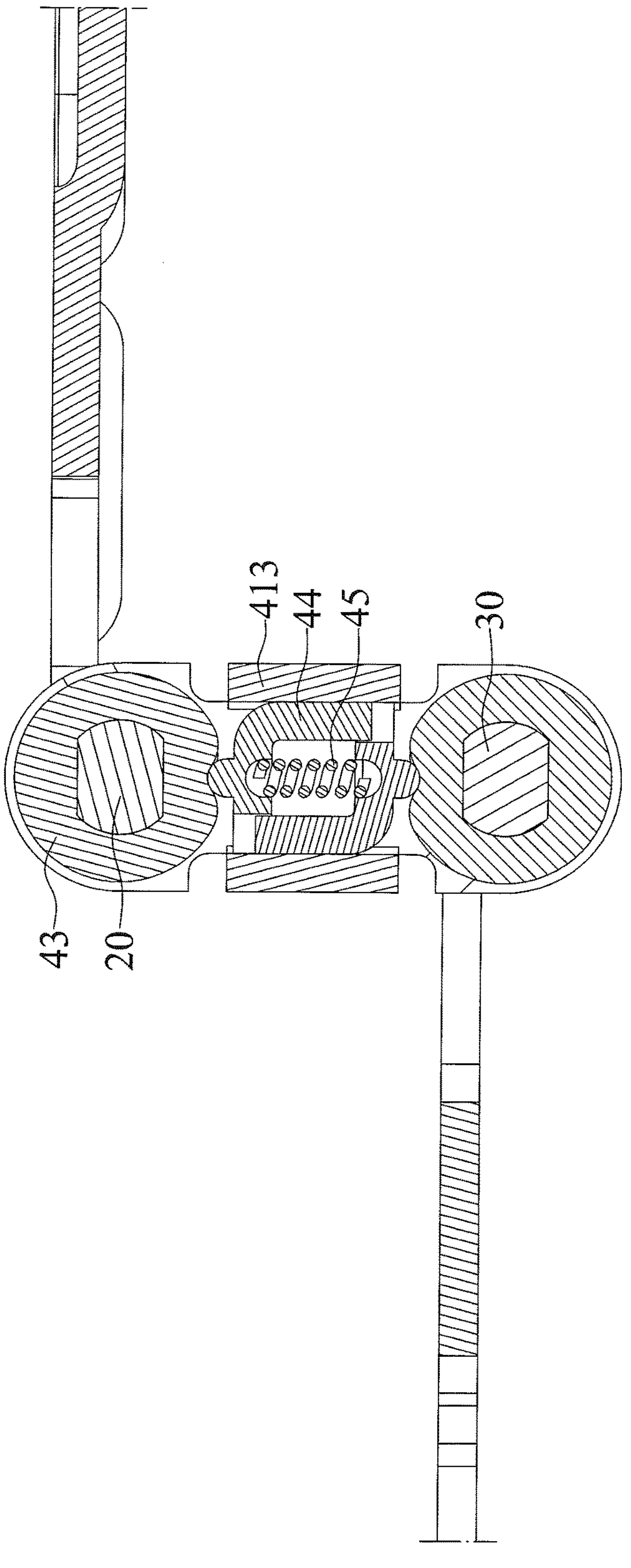
FIG. 8 is an extended cross-sectional view of FIG. 5, showing the hinge in yet another operating position between the closed and fully open positions.

A double-pintle hinge in accordance with the present invention includes a first pintle 20, a second pintle 30, and positioning mechanisms 40 configured to allow the first and second pintles 20 and 30 to rotate relative to each other to releasably retained positions.

The positioning mechanisms 40 include first and second joining members 41 and 42 interconnecting the first and second pintles 20 and 30, with each including a first end thereof coupled to the first pintle 20 in a manner that the first pintle 20 is rotatable about a first axis relative to the first and second joining members 41 and 42 and a second end thereof coupled to the second pintle 30 in a manner that the second pintle 30 is rotatable about a second axis relative to the first and second joining members 41 and 42. The first and second joining members 41 and 42 sandwich a first and second cams 43, a first and second cam followers 44, and a biasing member 45.

The first cam 43 is coupled to the first pintle 20 in a manner that the first cam 43 rotates when the first pintle 20 rotates. The second cam 43 is coupled to the second pintle 30 in a manner that the second cam 43 rotates when the second pintle 30 rotates.

The first and second cam followers 44 are positioned between the first and second cams 43. The first and second cam followers 44 respectively abut the first and second cams 43. The first and second cams 43 each have a periphery and include a recess 431 defined by the periphery. The first and second cam followers 44 each have an outer surface and include a protrusion 441 extending from the outer surface. The first and second pintles 20 and 30 have a first releasably retained position in which one of the protrusions 441 is releasably engaged with the respective recess 431, and a second releasably retained position in which the two protrusions 441 are releasably engaged with the respective recesses 431. The first and second cam followers 44 are movably connected with each other such that the first cam follower 44 is able to slide on the second cam follower 44. The first and second cam followers 44 each have a L-shaped body and include a slot 442 recessed in a first extension of the body and a tab 443 protruded from a second extension of the body. The slot 442 and the tab 443 of one of the first and second cam followers 44 respectively engage with the tab 443 and the slot 442 of the other of the first and second cam followers 44 when the first and second cam followers 44 are connected. The protrusion 441 on each of the first and second cam followers 44 is located on the first extension of the body thereof. The first and second joining members 41 and 42 include a first projection 413 and a second projection 413 extending therebetween. The first and second projections 413 are defined by two walls of one of the first and second cam followers 44. The first and second cam followers 44 are sandwiched between the first projection 413 and the second projection 413. The second extension of the body of the first cam follower 44 is movable and abuts the first projection 413. The second extension of the body of the second cam follower 44 is movable and abuts the second projection 413. Each of the first and second cam followers 44 includes the body thereof having two lateral edges and includes the protrusion 441 extending therefrom located between the two lateral edges. The two lateral edges of each of the first and second cam followers 44 are sandwiched between inner surfaces of the first and second joining members 41 and 42. The two lateral edges of each of the first and second cam followers 44 are defined by two lateral sides of the first extension as well as two lateral sides of the second extension.

The biasing member 45 is positioned between the first and second cam followers such that the first and second cam followers 44 are biased axially by the biasing member 45. The biasing member 45 is a coil spring. The first and second cam followers 44 each include a cavity to hold a distal end of the biasing member 45. As such, the biasing member 45 is stably positioned between the first and second cam followers 44.

The first and second pintles 20 and 30 each include a plurality of elastomeric members 50 engaged therewith. The plurality of elastomeric members 50 on the first pintle 20 are restrained between one of the first and second joining members 41 and 42 and a first retainer 60 and the plurality of elastomeric members 50 on the second pintle 30 are restrained between one of the first and second joining members 41 and 42 and a second retainer 60. The first retainer 60 and the first pintle 20 are in thread engagement. The second retainer 60 and the second pintle 30 are in thread engagement.

The double-pintle hinge 10 is a hinge for electronic devices and, particularly for an electronic device including a first member and a second member. As such, the first and second members are pivotally coupled to each other by the double-pintle hinge 10. Furthermore, one of the pintles 20 and 30 coupled to the first member rotates when the first member is pivoted. Likewise, the other of the pintles 20 and 30 coupled to the second member rotates when the second member is pivoted. The first pintle 20 is rotatable about a first axis. The second pintle 30 is rotatable about a second axis, which is parallel to the first axis.

The double-pintle hinge 10 has a fully open position and a closed position defined from two releasably retained positions of the first and second pintles 20 and 30. The first and second pintles 20 and 30 are limited to rotate between the fully open position and the closed position. The first and second pintles 20 and 30 respectively have an outer surface and include a first ridge 21 and 31 extending from the outer surface. The first joining member 41 has an outer surface and includes a second ridge 411 extending from the outer surface. The double-pintle hinge 10 in the fully open position includes the first ridge 21 of one of the first and second pintles 20 and 30 releasably engaged with the second ridge 411. The first ridge 21 of the respective first and second pintles 20 and 30 has two distal ends spaced radially and a curved outer edge joining the two distal ends. In addition, the outer surface of the first joining member 41 includes a third ridge 412 extending therefrom adapted to releasably engage with another first ridge 31. In view of the forgoing, the first and second cam followers 44 can move stably, thereby avoiding unwanted vibration and making noise. As set forth, the first and second cam followers 44 are positioned between the first and second cams 43, and respectively abut the first and second cams 43, and are movably connected with each other such that the first cam follower 44 is able to slide on the second cam follower 44. Each of the firsts and second cam followers 44 includes the lateral edge The foregoing is merely illustrative of the principles of this invention and various modifications can be made by those skilled in the art without departing from the scope and spirit of the invention.

What is claimed is:

1. A double-pintle hinge comprising:

a first pintle;

a second pintle; and positioning mechanisms configured to allow the first and second pintles to rotate relative to each other to releasably retained positions comprising:

first and second joining members interconnecting the first and second pintles, with each including a first end thereof coupled to the first pintle in a manner that the first pintle is rotatable about a first axis relative to the first and second joining members and a second end thereof coupled to the second pintle in a manner that the second pintle is rotatable about a second axis relative to the first and second joining members, and sandwiching a first and second cams, a first and second cam followers, and a biasing member;

the first cam coupled to the first pintle in a manner that the first cam rotates when the first pintle rotates;

the second cam coupled to the second pintle in a manner that the second cam rotates when the second pintle rotates;

the first and second cam followers positioned between the first and second cams, and respectively abutting the first and second cams, and movably connected with each other such that the first cam follower is able to slide on the second cam follower; and the biasing member positioned between the first and second cam followers such that the first and second cam followers are biased axially by the biasing member.

2. The double-pintle hinge as claimed in claim 1, wherein the first and second cams each have a periphery and include a recess defined by the periphery, wherein the first and second cam followers each have an outer surface and include a protrusion extending from the outer surface, and wherein the first and second pintles have a first releasably retained position in which one of the protrusions is releasably engaged with the respective recess, and a second releasably retained position in which the two protrusions are releasably engaged with the respective recesses.

3. The double-pintle hinge as claimed in claim 2, with the double-pintle hinge having a fully open position and a closed position defined from the two releasably retained positions of the first and second pintles, and wherein the first and second pintles are limited to rotate between the fully open position and the closed position.

4. The double-pintle hinge as claimed in claim 3, wherein the first and second pintles respectively have an outer surface and include a first ridge extending from the outer surface, wherein the first joining member has an outer surface and includes a second ridge extending from the outer surface, and wherein the double-pintle hinge in the fully open position includes the first ridge of one of the first and second pintles releasably engaged with the second ridge.

5. The double-pintle hinge as claimed in claim 4, wherein the first ridge of the respective first and second pintles has two distal ends spaced radially and a curved outer edge joining the two distal ends.

6. The double-pintle hinge as claimed in claim 4, wherein the outer surface of the first joining member includes a third ridge extending therefrom adapted to releasably engage with the other first ridge.

7. The double-pintle hinge as claimed in claim 2, wherein the first and second cam followers each have a L-shaped body and include a slot recessed in a first extension of the body and a tab protruded from a second extension of the body, and wherein the slot and the tab of one of the first and second cam followers respectively engage with the tab and the slot of the other of the first and second cam followers when the first and second cam followers are connected.

8. The double-pintle hinge as claimed in claim 7, wherein the protrusion on each of the first and second cam followers is located on the first extension of the body thereof, wherein the first and second joining members include a first projection and a second projection extending therebetween, wherein the first and second cam followers are sandwiched between the first projection and the second projection, with the second extension of the body of the first cam follower being movable and abutting the first projection, and with the second extension of the body of the second cam follower being movable and abutting the second projection.

9. The double-pintle hinge as claimed in claim 8, wherein the first and second projections are defined by two walls of one of the first and second cam followers.

10. The double-pintle hinge as claimed in claim 8, wherein each of the first and second cam followers includes the body thereof having two lateral edges and includes the protrusion extending therefrom located between the two lateral edges, wherein the two lateral edges of each of the first and second cam followers are sandwiched between inner surfaces of the first and second joining members, and wherein the two lateral edges of each of the first and second cam followers are defined by two lateral sides of the first extension as well as two lateral sides of the second extension.

11. The double-pintle hinge as claimed in claim 7, wherein the first and second cam followers each include a cavity to hold a distal end of the biasing member.

12. The double-pintle hinge as claimed in claim 1, wherein the first and second pintles each include a plurality of elastomeric members engaged therewith, and wherein the plurality of elastomeric members on the first pintle are restrained between one of the first and second joining members and a first retainer and the plurality of elastomeric members on the second pintle are restrained between one of the first and second joining members and a second restrainer.

13. The double-pintle hinge as claimed in claim 12, wherein the first retainer and the first pintle are in thread engagement, and wherein the second restrainer and the second pintle are in thread engagement.

* * * * *